Oct. 20, 1964

E. E. MALLORY ETAL 3,153,263

TIRE CURING PRESS

Filed Nov. 7, 1957

INVENTORS.
JAMES W. BRUNDAGE,
EDWIN E. MALLORY &
GEORGE N. MURPHY
BY
*Oberlin + Limbach*
ATTORNEYS Oct. 20, 1964     E. E. MALLORY ETAL     3,153,263
TIRE CURING PRESS Filed Nov. 7, 1957     10 Sheets-Sheet 2

FIG. 2

INVENTORS
JAMES W. BRUNDAGE,
EDWIN E. MALLORY &
GEORGE N. MURPHY
BY *Oberlin & Limbach*
ATTORNEYS

INVENTORS.
JAMES W. BRUNDAGE,
EDWIN E. MALLORY &
GEORGE N. MURPHY
BY Oberlin & Limbach
ATTORNEYS Oct. 20, 1964  E. E. MALLORY ETAL  3,153,263
TIRE CURING PRESS Filed Nov. 7, 1957  10 Sheets-Sheet 7

INVENTORS.
JAMES W. BRUNDAGE
EDWIN E. MALLORY &
GEORGE N. MURPHY

BY Oberlin & Limbach
ATTORNEYS

INVENTORS.
JAMES W. BRUNDAGE,
EDWIN E. MALLORY &
GEORGE N. MURPHY

BY *Oberlin + Limbach*
ATTORNEYS

Oct. 20, 1964  E. E. MALLORY ETAL  3,153,263
TIRE CURING PRESS
Filed Nov. 7, 1957  10 Sheets-Sheet 10

INVENTORS.
JAMES W. BRUNDAGE,
EDWIN E. MALLORY &
GEORGE N. MURPHY
BY Oberlin & Limbach
ATTORNEYS

United States Patent Office 3,153,263
Patented Oct. 20, 1964

3,153,263
TIRE CURING PRESS
Edwin E. Mallory, Cuyahoga Falls, James W. Brundage, Akron, and George N. Murphy, Cuyahoga Falls, Ohio, assignors to National Rubber Machinery Company, Akron, Ohio, a corporation of Ohio
Filed Nov. 7, 1957, Ser. No. 695,087
2 Claims. (Cl. 18—17)

The present invention relates generally as indicated to a tire curing press and more particularly, to a tire curing press for shaping and curing tubeless tires and to a novel method for so shaping and curing tubeless tires.

At the present time it is a prevalent practice to build tires on a generally cylindrical collapsible drum by wrapping successive layers of rubberized fabric, or ply stock, around said drum; applying bead rings on the shoulders of the drum after the under plies have been turned in over said shoulders; turning out the plies around the bead rings; applying further plies and turning the same inwardly around the bead rings; and finally, applying a band which constitutes the side wall and tread. After the tire constituents have thus been wrapped around the drum and upon each other, the drum is collapsed, whereupon the pulley band carcass thus made is removed to the tire curing press for shaping and curing. When tires are made in this manner there are certain inherent irregularities or variations in the wall thickness of the beads and also of other portions due for example, to the ply and bead splices.

Hitherto, for shaping and curing it has been substantially the universal practice to employ a tire curing press that is equipped with an inflatable diaphragm of elastic rubber-like material which exerts expanding influence inside the carcass to progressively swell the latter to tire shape as the beads are moved axially toward each other in contact with the toe rings of complementary mold sections. A disadvantage in using such diaphragm is that the curing cycle is somewhat longer than desired, since the curing medium that is circulated inside the diaphragm can act on the tire carcass only through the relatively thick wall of the diaphragm. Another disadvantage of the diaphragm type press is that, in the case of tubeless tires, it leaves much to be desired insofar as accurate formation and firm compacting of the beads is concerned. In tubeless tires the beads should be accurate and firm since the beads themselves must make air-tight engagement with the wheel rim flanges. Moreover, such diaphragm must be replaced at regular intervals, thus entailing substantial expense.

It is known, of course, that tubeless tire carcasses by their very nature, must have a gas imprevious wall structure, this having led prior inventors to attempt to shape and cure tubeless tire carcasses in a press omitting the aforesaid shaping and curing diaphragm. However, these prior attempts to dispense with the diaphragm have not been entirely successful because the prior inventors had used metallic bead-pressing rings for shaping the beads. Continuous bead-pressing rings have left much to be desired because of the relatively small radial overlap inside the carcass and if the overlap were increased to the desired amount then it becomes extremely difficult to button the pulley-band carcass over the continuous bead-pressing rings. Segmental collapsible bull rings of metal, while affording a solution to the overlap problem, have another inherent drawback (as do the continuous metal rings) and that is that a tire made on such press is apt to have a serious defect therein which arises from the positive outward displacement of the bead material in those zones where the wall thickness varies due, for example, to ply and bead splices. When the beads of the carcass are clamped between unyielding bead-pressing rings and the unyielding mold counterparts, the bead material has no place to go except radially outwardly and this produces relatively sharp ridges at the peripheries of the bead-pressing rings. Tires with such ridges have failed in use due to the zones of high stress concentration developed thereat. Moreover, such ridges are in the critical zones of the tire which are subjected to repeated stress reversals in use.

For the foregoing reasons, among others, tire manufacturers have continued to use tire curing presses that are equipped with shaping and curing diaphragms.

Accordingly, it is one principal object of this invention to provide a bagless tire curing press in which the beads of the tire are accurately formed and are compressed but yet without inducing outward flow of the bead material to form ridges as aforesaid on the inside of the finished tire.

It is another object of this invention to provide a tire curing press in which the beads of the tire are fully molded, at least for a radial distance of 1" beyond the inside diameter of the tire and without the objectionable radial flow of the bead material.

It is another object of this invention to provide a tire curing press in which the toe rings of the mold sections are designed to accommodate variation in thickness of the beads in any particular tire and also variation in bead thickness as in 4 ply and 6 ply tires as well as in the various sizes. For example, with the present invention it is possible to use the same bead ring with tires of 6:70, 7:10, 7:60, 8:00, 8:20, and 8:90 by 15".

It is another object of this invention to provide a tire curing press which has collapsible bead-pressing rings, which when collapsed, constitute pilots for facilitating the movement of the pulley band carcass to a position around the toe rings of the top and bottom mold section.

It is another object of this invention to provide a tire curing press in which the carcass contacting portion of each bead-pressing ring is resiliently deformable so as to accommodate variations in the thickness of the bead circumferentially therearound, whereby in shaping and pressing the beads, the bead material is not forced to flow radially outward to a point around the periphery of the bead-pressing ring.

It is another object of this invention to provide a bagless tire curing press in which one bead-pressing ring is formed with curing or cooling medium supply passages arranged to cause swirling of curing or cooling medium circumferentially around the tire carcass for effecting rapid curing or cooling and also for disposing of the air that was employed for shaping.

It is another object of this invention to provide a bead-pressing ring that is collapsible and that is equipped with means to remove condensed curing medium from within the shaped and cured carcass at the conclusion of the shaping and curing operation.

It is another object of this invention to provide a tubeless tire curing press in which the toe rings around the inner peripheries of the complementary mold sections are formed to constitute pilots to center the pulley band carcass therearound irrespective of variation in the diameters of the beads thereof and further, the toe rings are so formed that the bead material may roll around and adjust itself to the toe rings as the mold sections are progressively moved toward each other and as the carcass is progressively swelled to tire shape under the influence of fluid under pressure therewithin.

It is another object of this invention to provide a tire curing press in which the bead molding portions of the complementary mold sections are vented so as to form sharp-cornered beads which are conducive to the establishment of fluid-tight seals when the tire is mounted on a wheel.

It is another object of this invention to provide a bagless tire curing press which employs bead pressing rings that additionally serve as stripping means for stripping the finished tire from the mold sections without requiring the employment of a separate stripping mechanism in the press.

It is another object of this invention to provide a tire curing press with which and by which the cure time may be reduced by one-third or more as compared with the cure time of a conventional tire-curing press that utilizes a shaping and curing diaphragm.

It is another object of this invention to provide a tire curing press which lends itself to post-inflation and cooling of the cured tire while yet in the curing press but out of contact with the heated side wall and tread molding surfaces of the respective mold sections, such post-inflation and cooling steps having been found desirable as in tires that are provided with nylon or like cords.

It is another object of this invention to provide a tire curing press in which the segments of the bead pressing ring assemblies may be readily interchanged to accommodate different sizes of tires and in which the molds and toe rings similarly may be interchanged.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

Referring now more particularly to the drawings, the tire curing press and method constituting this invention will be found described in detail under the following headings:

I. The Press in General
II. The Bead-Shaping and Pressing Assemblies and the Actuating Mechanisms Therefor
III. Operation

I. THE PRESS IN GENERAL

Figures 1, 5:
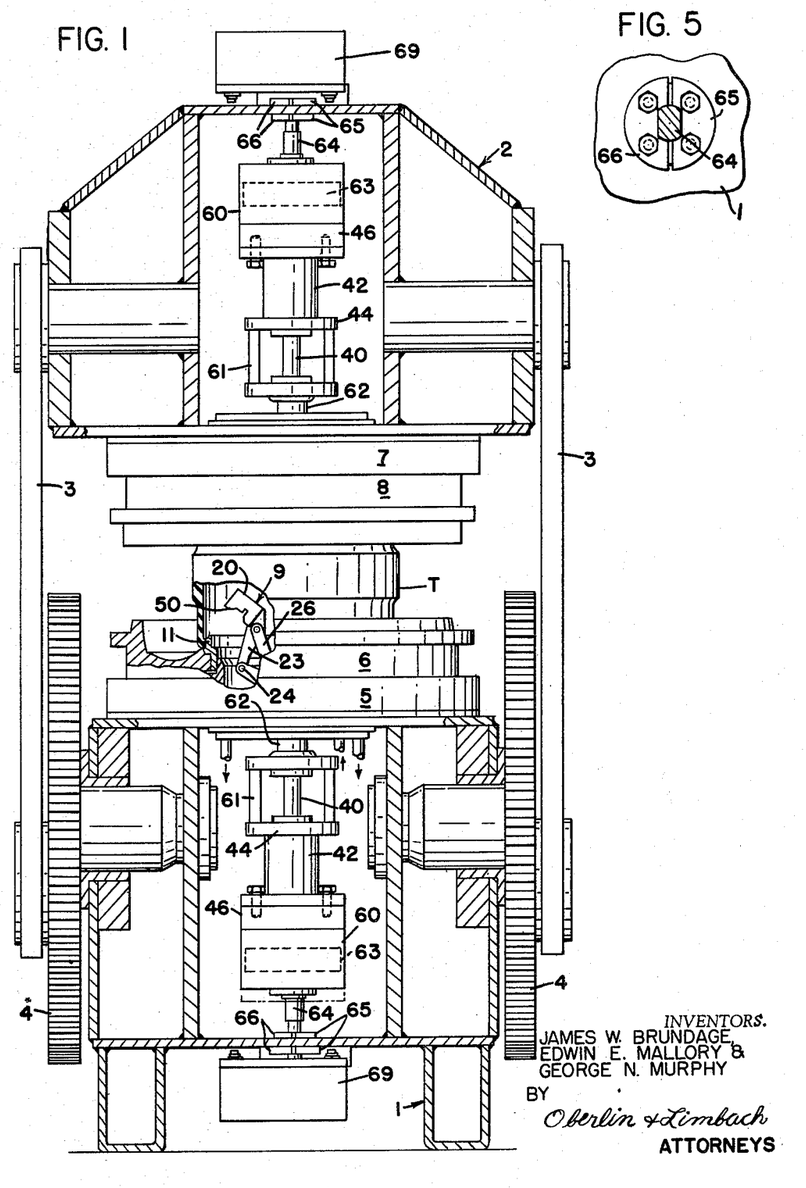
FIG. 1 is a front elevation view, partly in cross-section, showing a tire curing press constructed in accordance with the present invention.
FIG. 5 is a detail cross-section view taken substantially along the line 5—5, FIG. 2.

As best shown in FIG. 1, the tire-curing press comprises a base 1 and an upper vertically reciprocable press head 2 which is vertically slide-guided as on posts or the like, not shown. The press head 2 is vertically reciprocated as by the links 3, 3 pivotally secured thereto and to bull gear cranks, 4, 4 that are rotatably supported on opposite sides of said base 1. In general, the press base and head generally resemble that disclosed in the copending application of James W. Brundage, Serial No. 516,141, filed June 17, 1955 which issued as Patent No. 2,959,815.

The base 1 has mounted thereon a heating platen 5 which is jacketed for circulation of curing medium such as steam or hot water therethrough, and mounted on said platen is the bottom mold section 6. The press head 2 also has mounted thereon a heating platen 7 and carries the top mold section 8.

As is well-known in the art, the bottom and top mold sections 6 and 8 when brought together to mating engagement (see FIG. 4) define therebetween a cavity of tire shape.

In the case of the press shown in FIGS. 1 to 11, the bottom and top mold sections 6 and 8 have associated therewith the respective bead-shaping and pressing assemblies 9 and 10 which are adapted to clamp, shape, and compress the respective beads of the pulley band tire carcass T that is adapted to be positioned in upright position on the toe ring 11 of the bottom mold section 6 when the press is open, that is, with the upper press head 2 moved all the way up. In FIG. 1 the upper press head 2 has been shown brought down from its uppermost position until the toe ring 12 in the top mold section 8 has just contacted the top bead of the pulley band carcass T.

II. THE BEAD-SHAPING AND PRESSING ASSEMBLIES AND THE ACTUATING MECHANISM THEREFOR

(1) The Collapsible Bead Pressing Rings

Referring now to FIGS. 2 to 17, inclusive, the bottom and top bead-pressing assemblies 9 and 10 are identical, each comprising a collapsible ring made up of alternate short and long arcuate segments 20 and 21 having beveled juxtaposed ends. (See especially FIGS. 6 and 7.)

The short segments 20 are formed with arms 23 that are pivotally connected at 24 to a head 25 and links 26 are pivotally connected at 27 and 28 to the respective segments and to the vertically reciprocable head 29.

The long segments 21 are also provided with arms 30 that are pivotally connected at 31 to the first-mentioned head 25 and with links 32 pivotally connected at 34 and 35 to the respective long segments 21 and to the last-mentioned vertically reciprocable head 29.

(2) The Ring Collapsing Mechanisms

Figure 4:
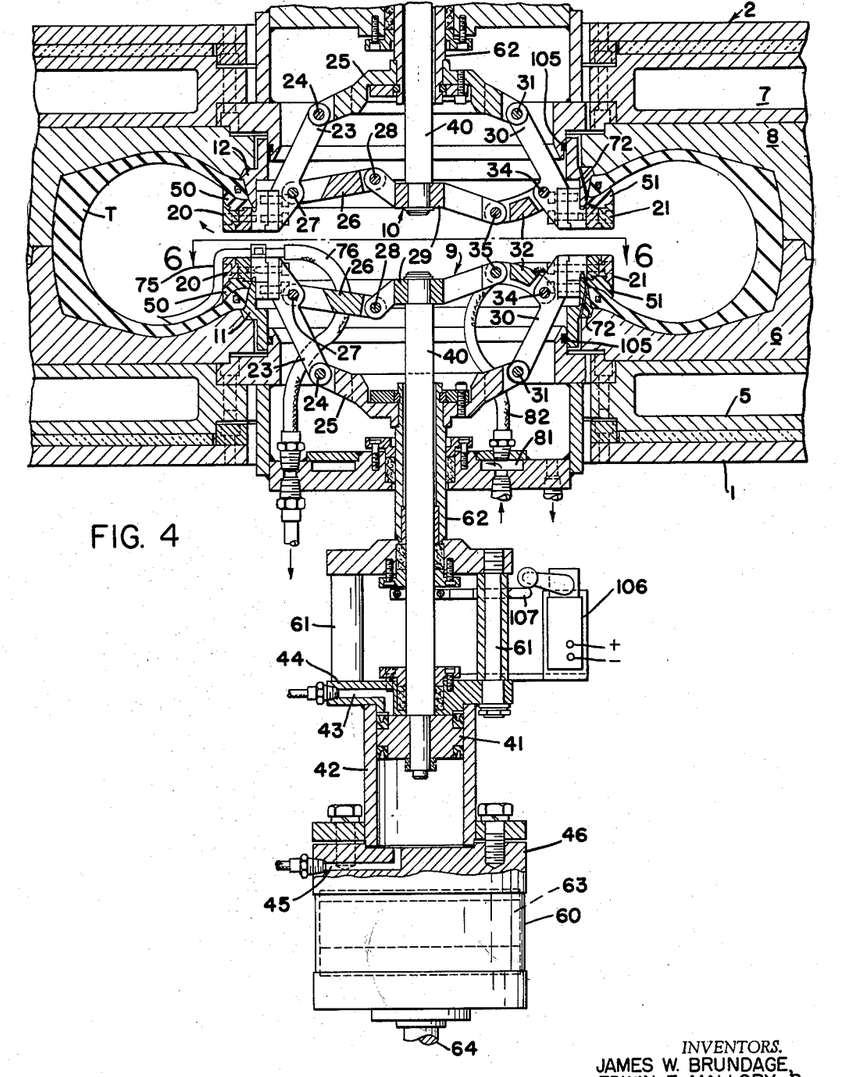
FIG. 4 is a central vertical cross-section view showing the press in closed position, the top and bottom mold sections being in mating engagement and the bead pressing and shaping mechanisms being firmly engaged with the beads of the carcass, the carcass being held and cured to final tire shape by circulating curing medium such as hot water or steam, under pressure through the interior thereof.
Figure 6:
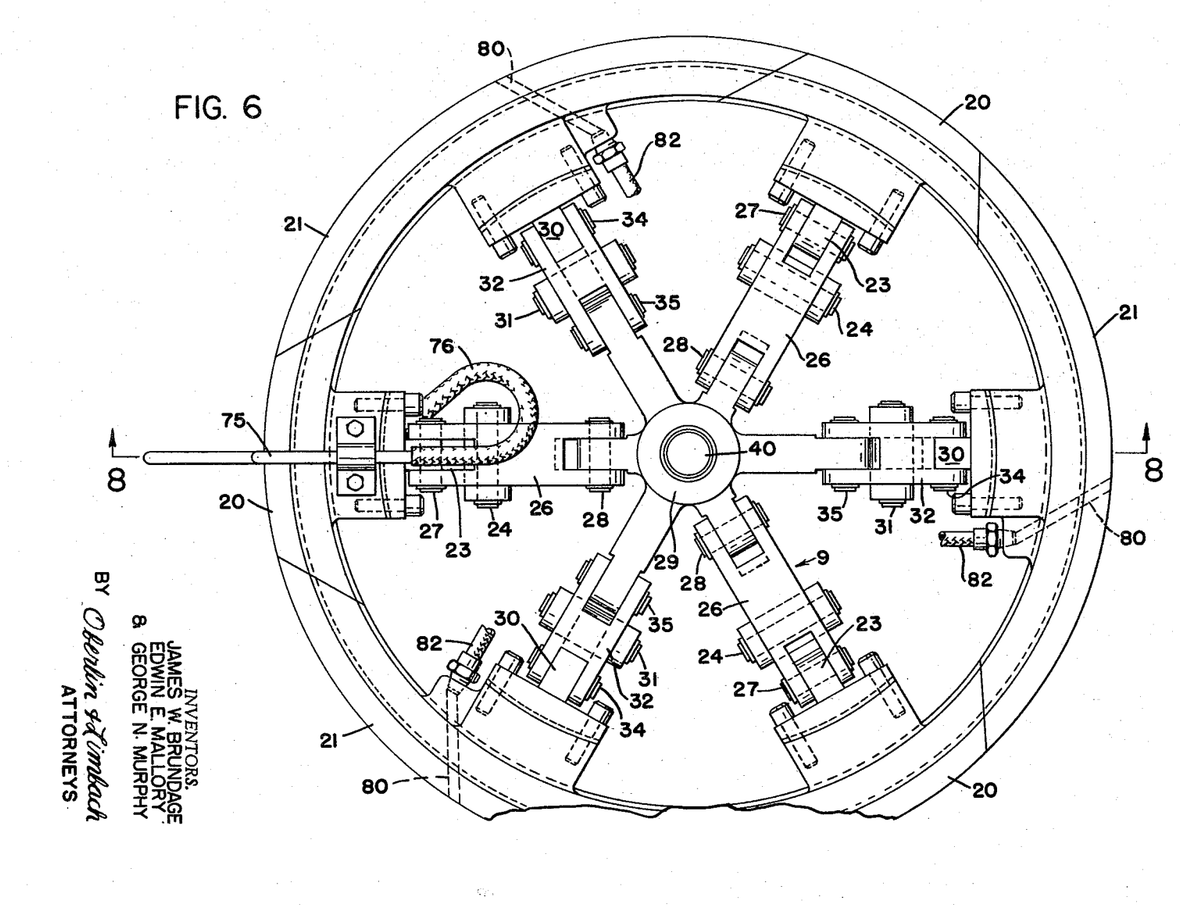
FIG. 6 is a top plan view of the bottom one of the bead-pressing rings in its uncollapsed or normal operating condition viewed along line 6—6, FIG. 4)

In FIGS. 2, 3, 7 and 9, the bead-shaping and pressing assembly associated with the bottom mold section 6 is shown in its collapsed condition to which condition it has been actuated by downward movement of the piston rod 40 (secured to head 29) and piston 41 to the bottom position in the cylinder 42 by admission of fluid through the passage 43 in the top head 44 of said cylinder 42. When it is desired to swing the segments 20 and 21 outwardly to form a continuous bead-shaping and pressing ring, fluid under pressure is admitted through the passage 45 in the bottom head 46 of said cylinder 42 whereby the piston 41 and piston rod 40 is moved to the upper limit of its stroke as shown in FIGS. 4 and 8. In that position the respective short and long segments 20 and 21 will be swung outwardly with their bias-cut ends in juxtaposition.

The bead-shaping and pressing assembly 10 associated with the top mold section 8 is of the same construction as assembly 9 associated with bottom mold section 6 except inverted. Thus, assembly 10 includes the cylinder 42 having a piston 41 reciprocable therein and a piston rod 40 carrying the head 29 to which the links 26 and 32 are pivotally secured.

Figure 7:
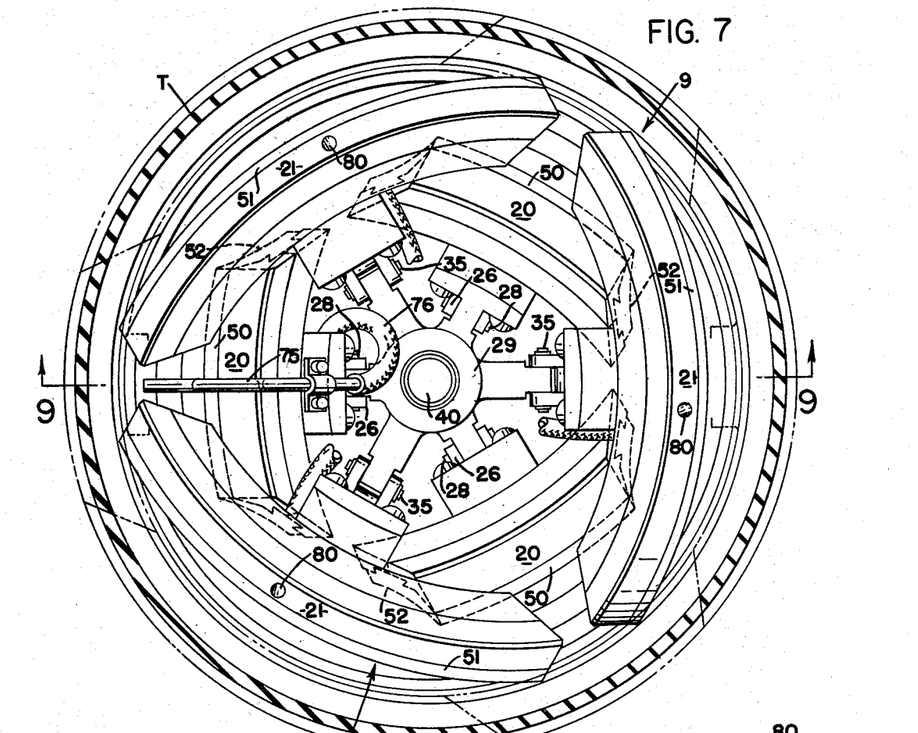
FIG. 7 is also a top plan view of the bottom one of the bead-pressing rings except showing the same in its collapsed condition for ease of placing a pulley band carcass over the generally conical pilot defined by the long segments of said ring.
Figure 8:
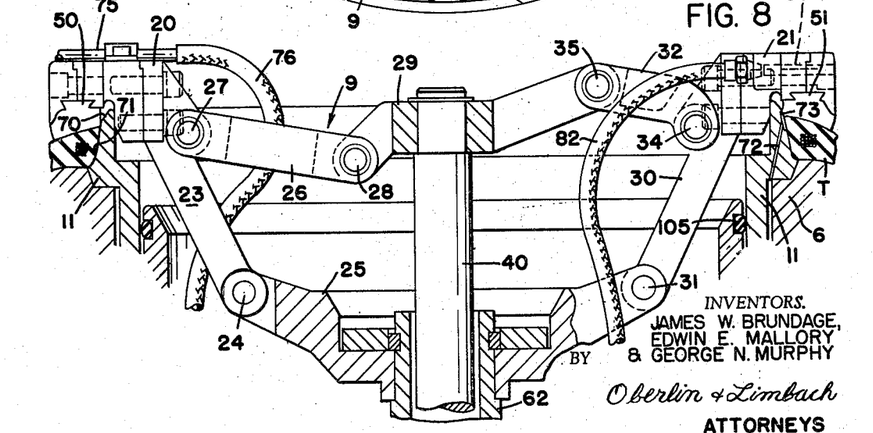
FIG. 8 is a cross-section view taken substantially along the line 8—8, FIG. 6.

As evident, especially from FIG. 7, the ends of the long segments 21 of the bead-shaping and pressing assembly 9 when in collapsed condition, act as a pilot to facilitate the centering of the bottom bead of a pulley band carcass T on the toe ring 11 of the bottom mold section 6. Likewise, the ends of the long segments 21 of the top bead-shaping and pressing assembly 10 when thus collapsed, will readily enter the top bead of the carcass T to assist in centrally locating the top bead around the top toe ring 12 of the top mold section 8.

Figures 9, 10, 11:
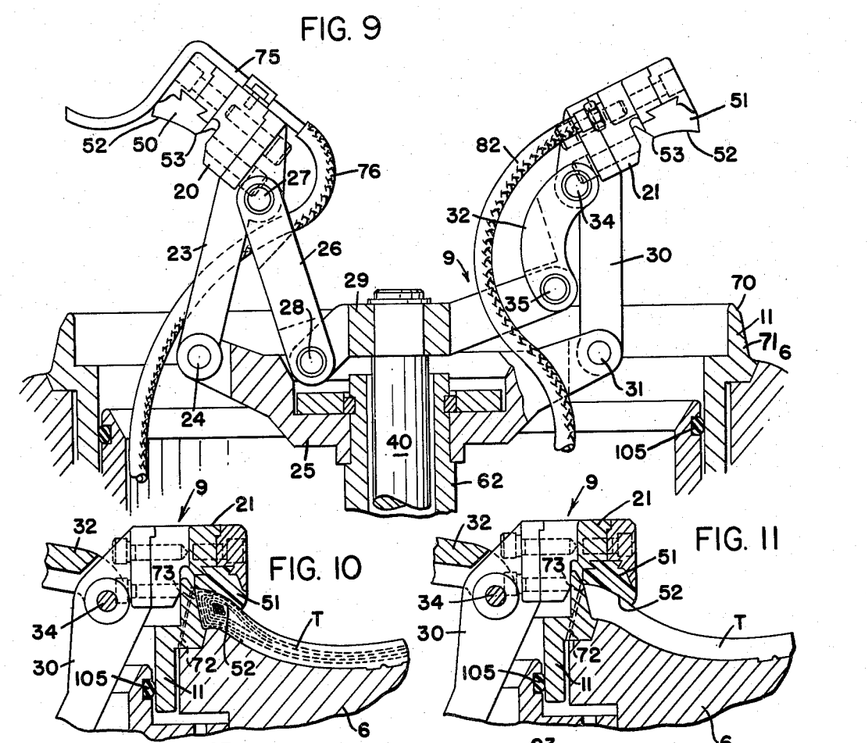
FIG. 9 is a cross-section view of the bottom bead-pressing assembly in its collapsed condition as taken substantially along the line 9—9, FIG. 7.
FIGS. 10 and 11 are detail radial sections showing on enlarged scale how the bead of the carcass is accurately shaped and compressed by the novel bead-pressing assembly herein despite variations in thickness circumferentially.

The respective short and long segments 20 and 21 have secured thereto, as by means of dovetail connections which insure secure mounting despite shrinkage, the respective short and long arcuate bead-shaping and pressing segments 50 and 51 made as of rubber or rubber-like material. Butyl bladder compound of 40 to 70 durometer hardness has been found suitable for the purposes at hand. Each of these elastically deformable segments 50 and 51 is formed with a concavely curved bead contacting surface 52 and as best shown in FIGS. 8, 10, 11, and especially FIG. 16, each segment has an inner frusto-conical surface 53 which is adapted to initially make sealed engagement with the end portion of the toe ring 11 or 12 (as the case may be) as the uncollapsed bead assemblies 9 and 10 are moved axially toward the respective mold sections 6 and 8.

(3) The Ring Actuating Mechanisms

The mechanism for axially moving the uncollapsed bead assembly 9 or 10 toward the respective mold section 6 or 8 may comprise a cylinder 60 which, through the aforesaid cylinder 42 and heads 46 and 44 thereof, and through tie rods 61 and tubular shaft 62 is secured to the head 25 previously described. Said cylinder 60 vertically reciprocates with respect to the piston 63 whereby, when fluid under pressure is admitted into the space above the piston 63, the cylinder 60 and the aforesaid parts secured thereto are moved upwardly in the case of the bottom assembly 9 and downwardly in the case of the top assembly 10. On the other hand, when fluid under pressure is admitted into the lower end of the cylinder 60 beneath the piston 63, the cylinder 60, together with its attached parts, is moved downwardly in the case of the bottom assembly 9 and upwardly in the case of the top assembly 10. Thus, the uncollapsed bead-shaping and pressing assemblies 9 and 10 may be axially moved toward the respective mold sections 6 and 8 to exert predetermined pressing and shaping pressure on the respective tire beads in accordance with the magnitude of the fluid under pressure in the cylinders 60.

It is to be noted that the bead-pressing assemblies 9 and 10 never are brought down into abutting engagement with the respective toe rings 11 and 12 nor with the respective mold sections whereby the beads of the carcass T will be shaped by pressure irrespective of whether the beads are thick ones, as in 6 ply tires, or whether they are thinner ones, as in 4 ply tires.

Stroke adjustment is effected by moving the piston rod 64 of piston 63 up or down as required, the piston rod 64 being held against rotation in the base 1 of the press or in the press-head 2 as the case may be, by means of plates 65–66 engaging opposite flats on the piston rod 64. The piston rod 64 has screw-threaded engagement in a rotatable but axially fixed worm wheel 67 (see FIG. 2) and the worm wheel 67, in turn, is rotated in either direction by means of a crank actuated worm 68. Such adjustment of the piston 63 is made so as to insure that the head 46 of cylinder 60 and the piston 63 will not prematurely come together into metal-to-metal engagement during the bead-shaping and pressing operation. The worm wheel 67 and worm 68 are disposed in a housing 69. Such engagement may, of course, be utilized in providing an adjustable stop for adjusting the amount of squeeze on the beads and for preventing excessive thinning of the beads.

(4) The Toe Rings

The toe rings 11 and 12 herein also are of unique form in that they include an end portion 70 having a relatively steep taper joining a base portion of less taper 71. In this way, if the carcass beads are undersize the inside surfaces thereof will rest upon the steeply tapered portions 70 of the toe rings 11 and 12, whereupon as the mold sections 6 and 8 are brought together the beads eventually are expanded and the bead material turns or adjusts so as to ride down the slowly tapered portions 71 of the toe rings. In the zone of intersection of these tapered portions 70 and 71 of the toe rings 11 and 12 a series of vents 72 are provided terminating in fine axially extending grooves 73 which prevent trapping of air, whereby the beads of the finished tire will have sharp toes at the intersections of the surfaces 52 and 71 since no air will be trapped in these regions.

(5) Curing Medium Withdrawal

For the purpose of disposing of condensed curing medium in the finished tire T one of the short segments 20 is provided with a tube 75 connected by means of a flexible hose 76 to the atmosphere or to a suction pump or the like. As will be seen later, the finished tire T may be distended after the cure. The condensate may be drawn out by vacuum, may be siphoned, or may be pumped out by air pressure in the carcass T.

(6) The Swirling Circulation of Curing Medium

Another feature of this invention which is best shown in FIGS. 2, 4, 6 and 7, the long segments 21 of the bottom bead-shaping and clamping assembly 9 are provided with tangentially arranged passages 80 to which curing medium is supplied, as from a manifold 81, there being flexible hoses 82 leading from the manifold 81 to the respective passages 80 in said long segments 21. Thus, when the bottom assembly 9 is in uncollapsed condition as in FIG. 6 and when curing medium is supplied under pressure into the manifold 81 the curing medium will be discharged from the passages 80 in the form of tangential jets which will cause the curing medium to swirl circumferentially-around the inside of the tire carcass T thereby enhancing the curing operation for maximum transfer of heat from the curing medium directly on the inside wall of the carcass. Likewise, when rapid cooling of the tire T is desired cooling fluid may be caused to swirl around the inside of the tire.

Figure 16:
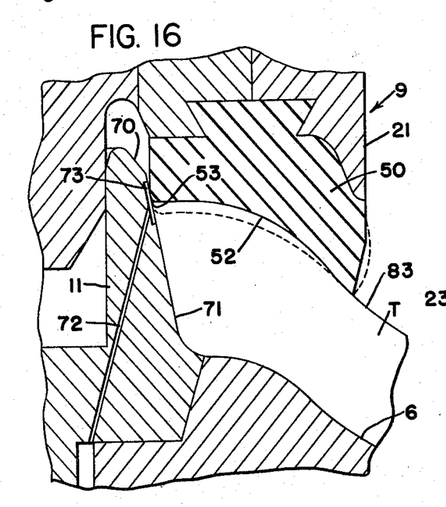
FIG. 16 is a much enlarged radial cross-section view showing how the instant bead-pressing assembly accommodates variations in the thickness of the bead circumferentially due to bead and ply splices, for example. The bead-pressing assembly herein is capable of assuming a circumferentially wavy form to accommodate such thickness variations, without necessity of positively displacing the bead material outwardly to and beyond the periphery of the bead-pressing assembly.

Referring to FIG. 16, there is shown therein the manner in which the rubber-like arcuate segments 50 and 51 accommodate thickness variations circumferentially around the beads of the carcass T. Despite such variations, as due to bead and ply splices, for example, the faces 52 of the segments 50 and 51 are capable of yielding unevenly thereanound so as not to positively displace excess bead material outwardly to the periphery of the bead-shaping and pressing assembly 9 or 10, and thus no thickened ridges or bumps will be formed in the areas identified by the reference numeral 83. Instead, the inside wall of the carcass will be smooth all the way around the inside of the carcass starting from the sharp inner toe of the bead. The dotted lines in FIG. 16 show how the surface 52 is capable of yielding as the bead thickness varies circumferentially around the carcass T.

Moreover, the ends of the arcuate elastic segments 50 and 51 will abut each other under pressure to thus eliminate radial lines at these points.

(7) Modified Forms of Bead Pressing Rings

Figures 12, 13, 14, 15, 15A:
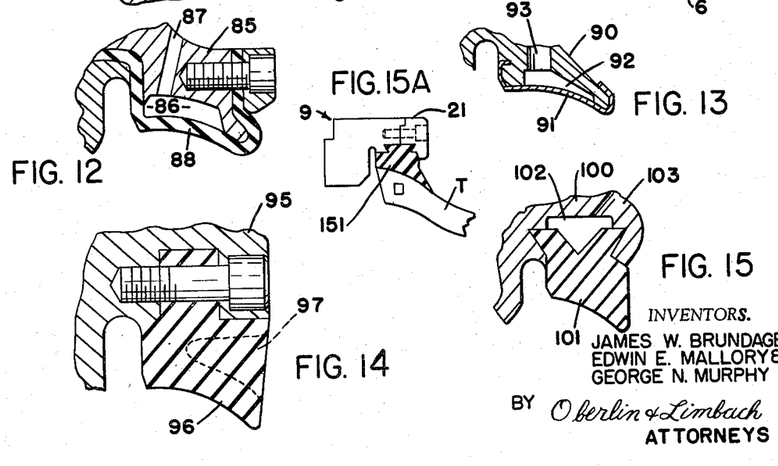
FIGS. 12 to 15A illustrate modified forms of bead-pressing assemblies that provide resiliently deformable bead-pressing and shaping surfaces.

In FIGS. 12 to 15A are shown some modified forms of the long and short segments. In FIG. 12 each segment 85 is provided with a fluid chamber 86 to which the curing medium under pressure has access through the opening 87 to thus yieldably press the diaphragm 88, as of rubber or rubber-like material, against the bead of the carcass. In FIG. 13 the resiliently deformable portion of each segment 90 comprises a thin metal shell 91, each segment being recessed to form a chamber 92 to which curing medium under pressure has access through the opening 93. In FIG. 14 each arcuate segment 95 has secured thereto a rubber-like strip 96 which preferably is recessed as at 97 so that the curing medium under pressure assists in pressing the strip 96 against the tire bead.

In FIG. 15 there is shown still a further modification in which the segment 100 carries a rubber-like strip 101 which is recessed to form a chamber 102 to which curing medium under pressure has access through the opening 103 so as to yieldably press the rubber-like strip 101 against the tire bead which is being shaped and compressed thereby. FIG. 15A is like FIG. 11 except that the rubber-like strip 151 has an outwardly extending lip that is very flexible to further eliminate the formation of a line where the bead merges with the side wall.

Regardless of which form of bead pressing ring is employed it is to be noted that the same arms 23 and links 26 may mount segments 20 for making 14", 15", 16" etc. tires T and likewise the same arms 30 and links 32 may mount corresponding radius segments 21. The toe rings 11 and 12 for each different size tire will have an inner diameter to seal the curing chamber at O-rings 105. The last-mentioned feature is of great importance in that one press can be readily converted for vulcanizing different size tires, in that molds of different thicknesses may be used, and in that the press need not be dismantled to remove or replace the molds.

(8) Safety Feature for Bead Pressing Ring Actuation

Figure 2:
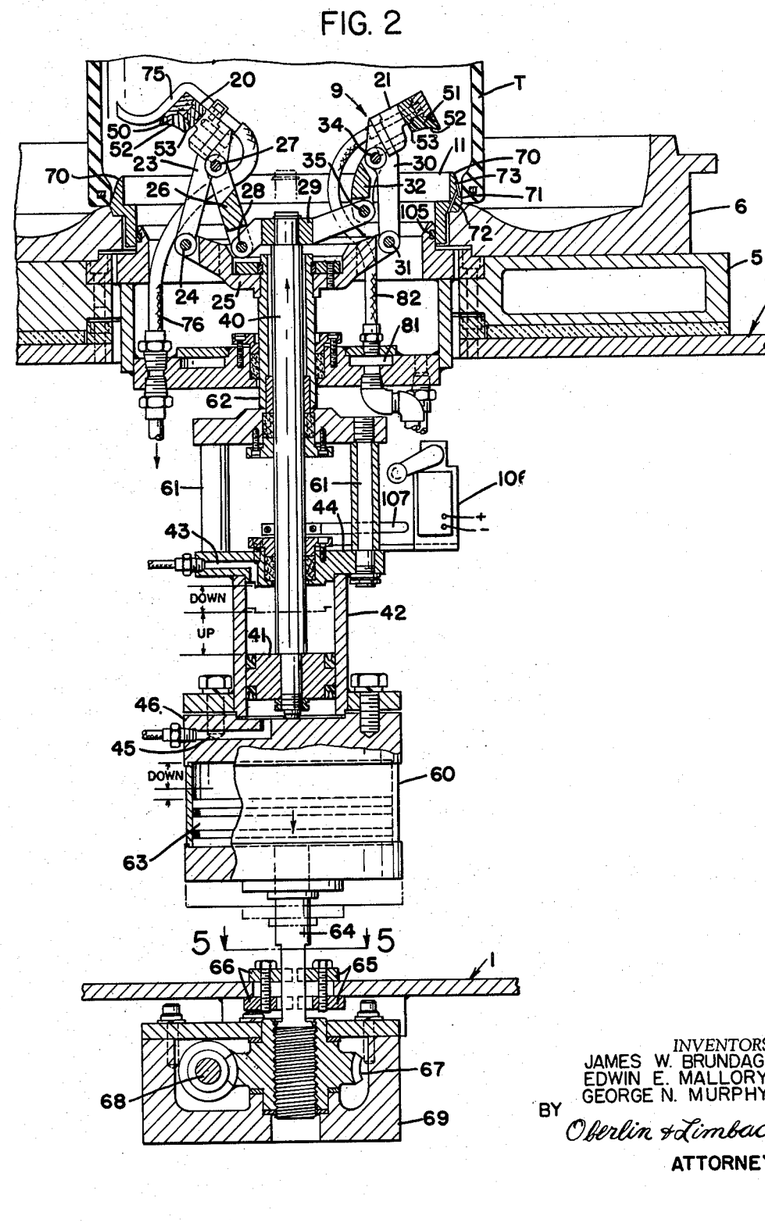
FIG. 2 is a central vertical cross-section view on enlarged scale showing the bead pressing and shaping mechanism associated with the bottom mold section, said mechanism being shown in radially collapsed condition.
Figure 3:
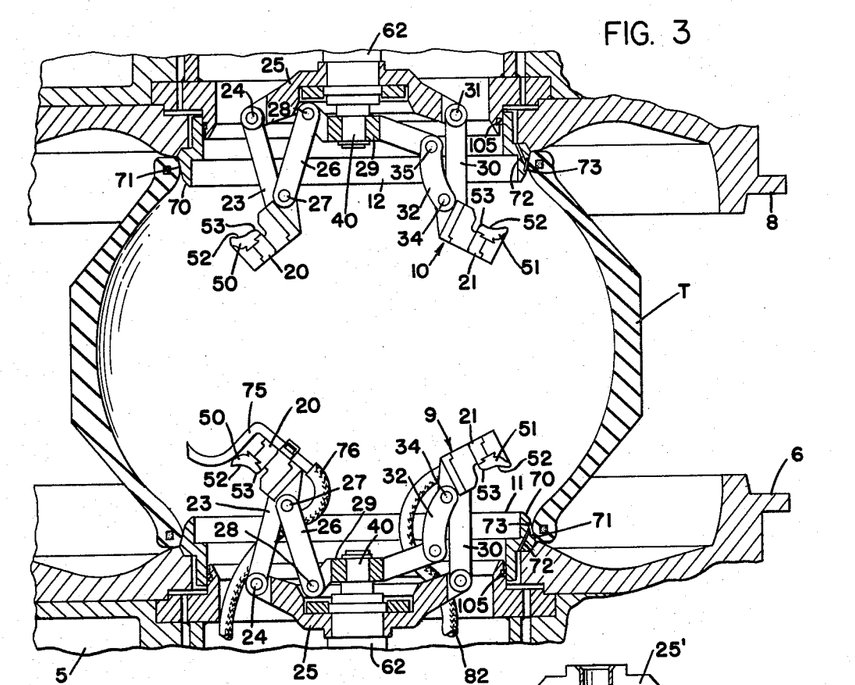
FIG. 3 is a vertical cross-section view showing a pulley band carcass in the partially swelled condition which it assumes as the top and bottom mold sections are moved axially toward each other, the beads of the carcass not yet having been clamped whereby they are free to adjust themselves around the toe rings of the respective mold sections.

As shown in FIGS. 2 and 4 there is mounted on head 44 a limit switch 106 for actuation by the arm 107 carried on rod 40, the switch 106 being in circuit with the fluid supply to cylinder 60 so that the latter can move down only when the segments 20 and 21 are in uncollapsed condition. Thus when rod 40 is moved up from the FIG. 2 position to the FIG. 4 position the arm 107 will actuate the switch 106 to permit actuation of cylinder 60. When cylinder 60 is actuated downwardly, the rod 40, arm 107, and switch 106 will move down in unison.

(9) Modified Actuators for Bead Pressing Rings

Figure 17:
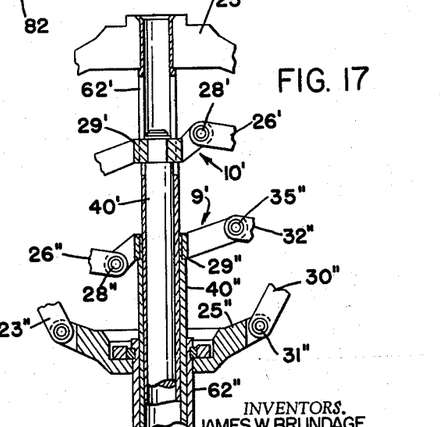
FIG. 17 is a modification in the mounting of the bead-pressing mechanisms in the base of the press.

Referring to FIG. 17, this shows a modification in which the actuating mechanisms for the bead pressing assemblies 9' and 10' (corresponding to assemblies 9 and 10 in FIGS. 1 to 11) are mounted in the base 1 of the press or in the press head 2. Thus, the top segments are uncollapsed by moving rod 40' and head 29' upwardly to the position shown in FIG. 17 and said top segments are moved upwardly to operating position by tube 62' which is secured to head 25'.

Similarly, the bottom segments of assembly 9' are uncollapsed by moving tube 40" upwardly together with the head 29" and are brought to operating position by downward movement of tube 62" and the head 25" to which said tube 62" is secured. The reference numerals herein used correspond to those heretofore used except adding the prime (') and double prime (").

III. OPERATION

Referring now to FIGS. 18 to 28, following is an outline of the preferred steps in the operation of the present tire curing press.

Figure 18:
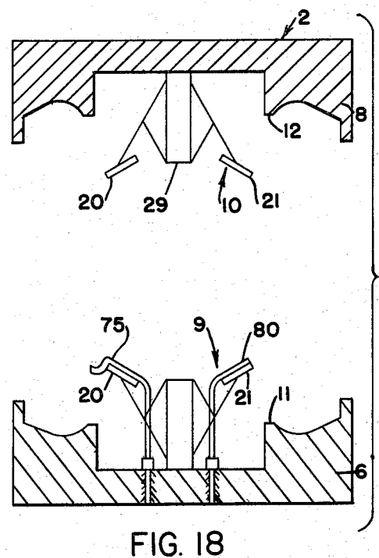
FIGS. 18 to 28 inclusive, are a series of schematic diagrams showing a preferred sequence of steps in the forming of a tubeless tire in a bagless tire curing press of the type constituting the present invention.

(1) FIG. 18.—The press is fully open and the bead-shaping and pressing assemblies 9 and 10 are in collapsed condition.

Figure 19:
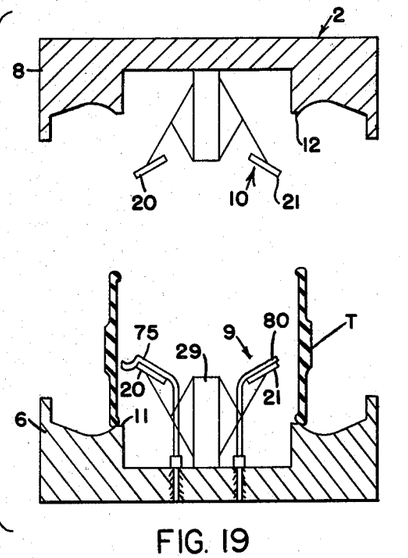

(2) FIG. 19.—The pulley band carcass T has been inserted between the bottom and top mold sections 6 and 8 and has been slipped over the collapsed bottom assembly 9 so that the bottom bead rests upon the toe ring 11 of the bottom mold section 6.

Figure 20:
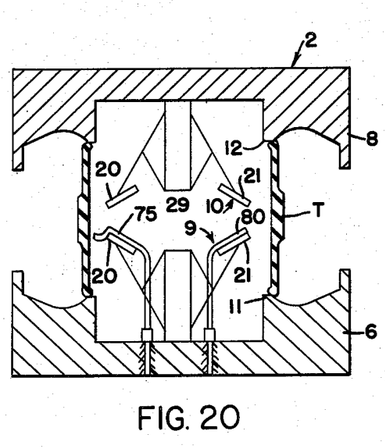

(3) FIG. 20.—In this position of the press the top mold section 8 has been moved downwardly until its toe ring 12 engages the top bead of the pulley band carcass T.

Figure 21:
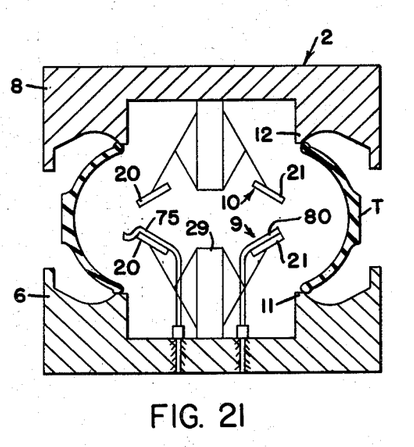

(4) FIG. 21.—The top mold section 8 has been moved down farther whereby as a consequence of the beads of the carcass T being moved axially toward each other and the presence of fluid under pressure inside the carcass T, the latter has been caused to partly swell out between the mold sections 6 and 8.

Figure 22:
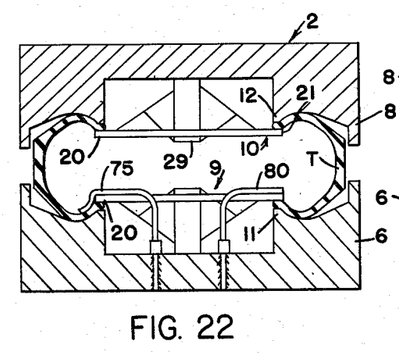

(5) FIG. 22.—The press is nearly closed and the pulley band carcass T has been shaped to almost tire shape. At about this stage of the operations the respective bead-shaping and pressing assemblies 9 and 10 have been uncollapsed and are drawn toward the respective mold sections 6 and 8.

Figure 23:
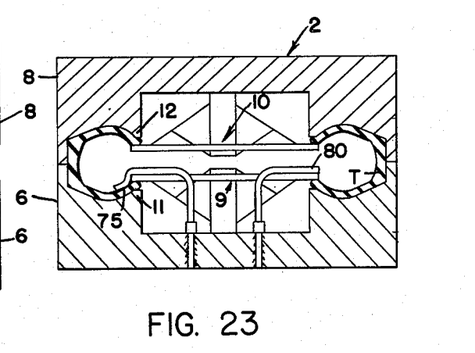

(6) FIG. 23.—The respective bead-shaping and clamping assemblies 9 and 10 are continuously pressed against the beads of the carcass T and with the mold sections 6 and 8 in mating engagement, curing medium under pressure may be circulated circumferentially around in the carcass T (by reason of the tangential disposition of passages 80) to effect curing to final shape. The cooling and curing medium and condensate may be removed prior to the separation of the mold sections 6 and 8. This may be done by permitting the pressure in the tire to force the cooling or curing medium in the fluid or gaseous state out through the suction tube 75.

Figure 24:
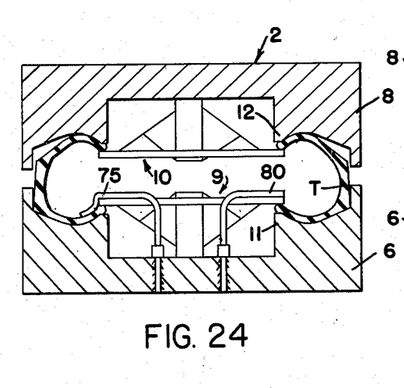

(7) FIG. 24.—The top mold section 8 has been moved upward, say about 2", while yet the top assembly 10 holds the top tire bead against the top mold section 8 and since said top mold section has been treated with anti-stick compound, the tread and side wall portion of the tire is stripped from the top mold section.

Figure 25:
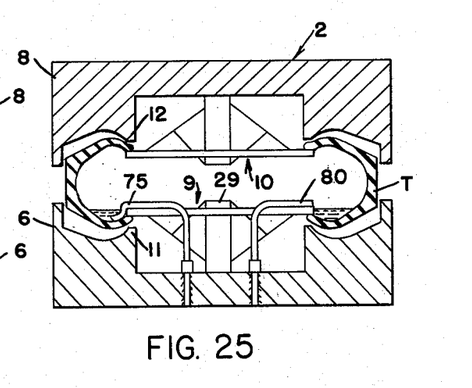

(8) FIG. 25.—The top mold section 8 is moved up slightly and there is a dwell at this position, the bottom asesmbly 9 having been raised slightly to permit the stripping of the tire T from the bottom mold section 6. If the condensate has not been previously removed, the tire T is distended so that the condensate collects as a pool and is drawn out by the suction tube 75.

Figure 26:
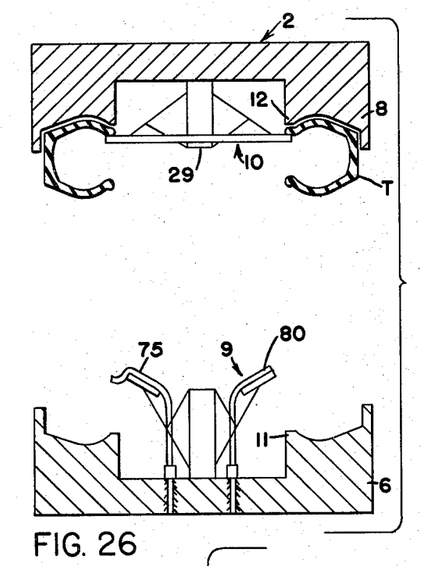

(9) FIG. 26.—The bottom assembly 9 is now collapsed to withdraw the same radially inward out of the tire T whereby continued upward movement of the top mold section 8 carries the tire T up therewith resting on the uncollapsed top assembly 10.

Figure 27:
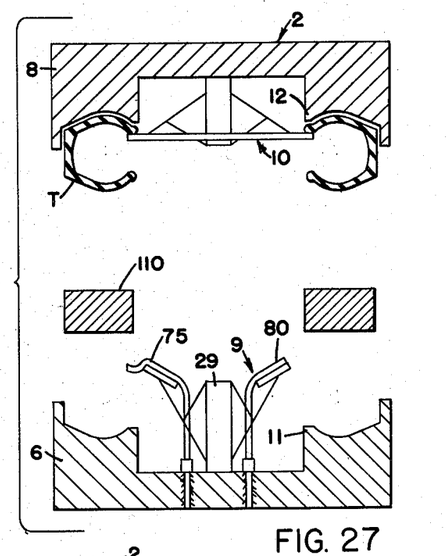

(10) FIG. 27.—In this position of the press with the top mold section 8 at the upper end of its movement, a tire catching conveyor 110 or the like, is inserted between the top and bottom mold sections.

Figure 28:
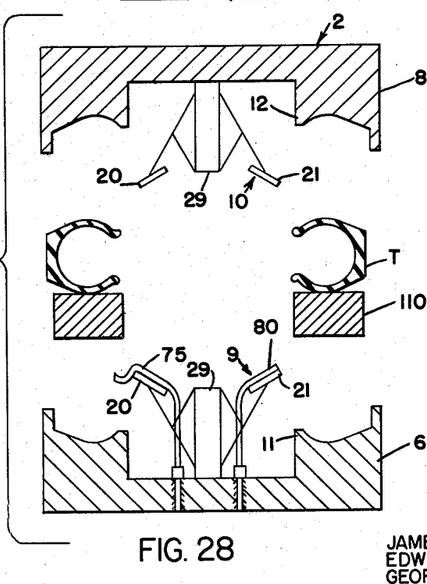

(11) FIG. 28.—When the top bead-shaping and pressing assembly 10 is collapsed, the finished tire T drops down onto the conveyor 110 for lateral withdrawal from between the bottom and top mold sections 6 and 8. After the finished tire T has been withdrawn, the press is in the condition of FIG. 18 ready for the loading of the next pulley band carcass T as in FIG. 19, and repetition of the foregoing operations to form and unload the next finished tire T.

It has been found desirable in the case of nylon cord tires to circulate coolant such as cold water through the cured tire T while the tire is inflated to stress the cords while cooling. This may be conveniently done following the step of FIG. 25 by restoring the parts to the FIG. 22 position for post-inflation and cooling. In this way the cured tire is cooled and the cords thereof are stressed while the side walls and tread are out of contact with the molding surfaces of mold sections 6 and 8.

Following is an outline of a typical bagless cure for a 4 ply, rayon cord, passenger car tire:

(a) As the top mold section 8 moves down from the position shown in FIG. 20 a valve is opened to admit shaping air at, say, a progressively increasing pressure up to about 20 p.s.i., the platens being heated to 338° F.;

(b) When the press is closed as in FIG. 23 saturated 100 lb. steam is circulated through the tire carcass T for one-half minute with the circulating drain open, the resulting swirling of the steam being effective to swirl the shaping air for scooping or purging it out of the carcass T so as not to form trapped air pockets;

(c) The drain opening is then closed and the tire carcass T is cured for eleven and one-fourth minutes using 100 lb. steam;

(d) Then, opening the drain, air at 20 p.s.i. is admitted whereby the internal pressure in the carcass T is blown down slowly with condensate removed from the inside of the carcass. This takes about three-fourths of a minute; and (e) Finally, the air is cut off allowing an internal relief period of about one-fourth minute.

The foregoing cure takes 12¾ minutes as compared with the present 20 minute period required on a bladder type vulcanizer.

If desired, in between steps (a) and (b) above air at 200 p.s.i. may be admitted for a period of one minute to provide additional molding force.

While the present invention is principally concerned with shaping and curing of pulley-band carcasses, it has utility in retreading of tubeless tires or in retreading of conventional tube tires. In order to render the walls of the tire to be retreaded gas impervious, it is contemplated to spray the interior thereof with a rubber-like sealant. If desired, nozzles 80 may be used or a special set of nozzles may be provided as on the top bead pressing assembly 10. Here again, the swirling motion of the sprayed sealant serves to promote uniform coating of the inside wall of the carcass to be retreaded and the swirling motion of the curing medium purges the carcass and materially cuts down the time of the curing cycle of the new tread slab.

Other modes of applying the principle of the invention may be employed, change being made as regards the details described, provided the features stated in any of the following claims, or the equivalent of such, be employed.

We therefore particularly point out and distinctly claim as our invention:

1. Means for pressure shaping the beads of a tire carcass while being cured in a sectional mold, said means comprising a collapsible bead shaping and pressing assembly having annular, resiliently deformable portions which, in all operating positions are axially clear of said mold sections, and which define annular spaces with the respective mold sections and toe rings thereof in which spaces the beads are adapted to be shaped and pressed; and means for urging said portions of said assembly toward the respective mold sections to clamp and to shape the tire beads, said portions yielding to accommodate variations in bead thickness without inducing radial outward displacement of bead material and corresponding thickening of the carcass at the peripheries of said portions; means for collapsing said assembly; and limit means rendering said means for urging said portions toward the respective mold sections inoperative except when said assembly is in uncollapsed, bead pressing condition.

2. For use with a tire curing press having complementary separable mold sections, a collapsible bead clamping and shaping assembly comprising two opposite circumferential series of segments which, in uncollapsed condition of said assembly, provide opposite annular surfaces designed to be axially clear of said mold sections in all operating positions and to contact the inside bead surfaces of a tire carcass and thereby clamp the beads against the mold sections of such press, such annular surfaces being defined by two opposite circumferential series of bead contacting segments of resiliently deformable material, piston-cylinder means for axially spreading apart said series of segments toward the respective mold sections so as to exert such bead clamping and shaping pressure, said bead contacting segments yielding without causing radial outward displacement of bead material to zones of the carcass beyond the peripheries of such annular surfaces, and means for collapsing said assembly to facilitate positioning of a tire carcass therearound.

References Cited in the file of this patent

UNITED STATES PATENTS

| | | |
|---|---|---|
| 1,101,732 | Doughty | June 30, 1914 |
| 1,757,376 | Laursen | May 6, 1930 |
| 1,932,692 | Fetter | Oct. 31, 1933 |
| 2,031,560 | Day | Feb. 18, 1936 |
| 2,340,264 | Freeman | Jan. 25, 1944 |
| 2,438,952 | Te Grotenhuis | Apr. 6, 1948 |
| 2,571,258 | Kolins | Oct. 16, 1951 |
| 2,645,265 | O'Neil | July 14, 1953 |
| 2,801,442 | Moslo | Aug. 6, 1957 |
| 2,808,618 | Soderquist | Oct. 8, 1957 |
| 2,812,544 | Soderquist | Nov. 12, 1957 |
| 2,812,545 | Soderquist | Nov. 12, 1957 |
| 2,812,546 | Soderquist | Nov. 12, 1957 |
| 2,834,049 | White | May 13, 1958 |
| 2,858,566 | Brundage | Nov. 4, 1958 |
| 2,901,772 | Frohlich et al. | Sept. 1, 1959 |
| 2,904,833 | Frohlich et al. | Sept. 22, 1959 |
| 2,959,815 | Brundage | Nov. 15, 1960 |